(No Model.)
R. G. MARCY.
TUBULAR WELL VALVE.
No. 318,770. Patented May 26, 1885.
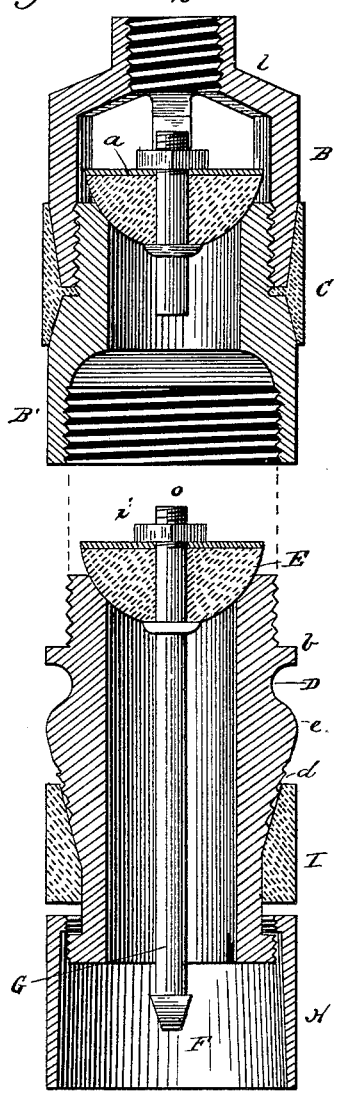
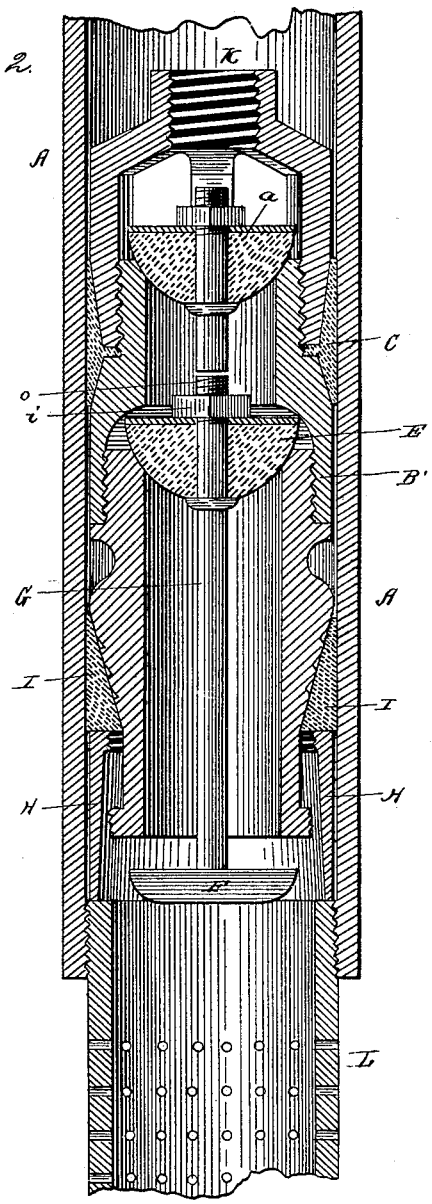
WITNESSES
Chas. D. Davis
Edwin L. Jewell
INVENTOR
R. G. Marcy.
By C. M. Alexander
Attorney

UNITED STATES PATENT OFFICE.

RUFUS G. MARCY, OF KENDALLVILLE, INDIANA.

TUBULAR-WELL VALVE.

SPECIFICATION forming part of Letters Patent No. 318,770, dated May 26, 1885.

Application filed February 5, 1885. (No model.)

*To all whom it may concern:*

Be it known that I, RUFUS G. MARCY, a citizen of the United States, residing at Kendallville, in the county of Noble and State of Indiana, have invented certain new and useful Improvements in Tubular-Well Valves, of which the following is a specification, reference being had therein to the accompanying drawings.

This invention relates to valves and valve-connections to be used in connection with the tubing of tubular wells, the peculiarity of construction of which will be hereinafter set forth.

In the accompanying drawings, forming a part of this specification, Figure 1 represents a section taken longitudinally of the two valve-cases detached. Fig. 2 represents a longitudinal section showing a portion of the well-tubing and the two valve-cases, the latter being secured together and sunk to the strainer-case.

In the figures, A represents the tube, which is usually inserted in a driven well and through which the water flows.

B and B' represent two hollow cylinders, which are provided with suitable threads near their centers, by means of which they are connected together. Breaking the joint where the two parts come together is a suitable packing-ring, C, of any desirable material. The upper portion of this case or cylinder is provided with a beveled valve-seat, into which a half-round ball-valve is made to fit. This half-round valve is provided with a suitable stem, has a metal plate upon its face, and is secured to the stem by means of a nut, as represented. The valve *a* has above it an ordinary cage, *l*, in the upper end of which is a female screw for receiving the end of the rod which lowers the valves in the tubing.

D represents a hollow cylinder and valve-case, which is irregular, as represented upon its exterior surface. In the upper end of this valve-case is a beveled seat adapted to receive a half-round valve, E, similar to the one above described. This valve has a stem, which reaches through and below the case D, and is provided on its lower end with a cross-bar, F, which is longer than the diameter of the bore of the case D, and is for the purpose of preventing the valve from rising only a proper distance.

I represents a band of rubber packing which surrounds the cylinder D. The outside of this cylinder flares outward and upward for a distance, and is provided with corrugations, to prevent the rubber packing-ring from slipping when forced up to make a water-tight joint between it and the tubing A.

*e e* represent the apex of the enlargement on the cylinder. The surface of the cylinder then falls away, so that the upper edge of the rubber may after passing over the enlargement *e* shrink over it and hold said packing in place.

H represents a threaded short cylinder, which screws over the lower end of cylinder D. This cylinder has only a few threads, and after passing above the threads on cylinder D it plays freely up and down in a space sufficient to play against the lower edge of packing-ring I and force it to make a water-tight packing. By this construction of the cylinders D H it will be seen that after the cylinder H has passed above the flange on the lower end of the tube D it is held from becoming accidentally and wholly detached from said tube D, thus rendering it impossible to lose said cylinder H or have it change position so as to interfere with the regulating movements of said cylinder H.

When these valve-cases are to be used, the upper section, B, is screwed to the lower section, D, until its lower edge strikes the flange *b b*. The pump-rod is then screwed into the cage *l* at K, and the section D is lowered until it strikes the top of the strainer, which is represented by L, Fig. 2. The top of the strainer presses against the cylinder H at its bottom, and said cylinder pressing against the lower edge or bottom of the rubber ring I forces it upward on the corrugated and enlarged surface of the case D, and causes it to form a water and air tight joint between the cylinder or case D and the tubing A. After the lower valve-section, D, has been properly seated and secured on top of the strainer, the upper valve-section is unscrewed from it by the rod which has carried the two down into the tubing.

The upper section is then raised to such location as may be necessary or desirable, and the pump is then ready for work.

Having thus fully described my invention, what I claim as new, and desire to secure by Letters Patent, is—

1. The combination, with the irregularly-shaped cylinder D, having a screw-threaded flange at its lower end, of the elastic packing-ring I and packing-cylinder H, screw-threaded near its upper end, whereby it is made to turn clear of the flange and above the same, and be held thereby against accidental removal, substantially as specified.

2. The combination, with the irregularly-shaped cylinder D, of the beveled packing-ring I, the packing-cylinder H, adapted to screw over and clear of the lower end of the cylinder D, and the strainer-case L, whereby the packing-cylinder is forced against the packing-ring, substantially as and for the purposes specified.

In testimony whereof I affix my signature in presence of two witnesses.

RUFUS G. MARCY.

Witnesses:
HENRY I. PARK,
S. C. FRANKS.